US008650476B1

(12) United States Patent
Belle et al.

(10) Patent No.: US 8,650,476 B1
(45) Date of Patent: Feb. 11, 2014

(54) LOCALIZED FEEDBACK FOR CONTENT CREATION

(75) Inventors: Jeffrey L. Belle, Seattle, WA (US); Janna Hamaker, Issaquah, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 346 days.

(21) Appl. No.: 12/960,137

(22) Filed: Dec. 3, 2010

(51) Int. Cl.
*G06F 17/00* (2006.01)

(52) U.S. Cl.
USPC ............... 715/230; 715/232; 705/26.35

(58) Field of Classification Search
USPC ................ 715/230, 232; 705/26.35
See application file for complete search history.

(56) References Cited

U.S. PATENT DOCUMENTS

| 5,146,552 | A | 9/1992 | Cassorla et al. |
| 2003/0081000 | A1 | 5/2003 | Watanabe et al. |
| 2005/0132281 | A1 | 6/2005 | Pan et al. |
| 2006/0161578 | A1 | 7/2006 | Siegel et al. |
| 2007/0055926 | A1* | 3/2007 | Christiansen et al. ........ 715/512 |
| 2008/0222552 | A1* | 9/2008 | Batarseh et al. ............... 715/776 |
| 2009/0037259 | A1* | 2/2009 | Blenk ............................. 705/10 |
| 2009/0052778 | A1 | 2/2009 | Edgecomb et al. |
| 2009/0204882 | A1 | 8/2009 | Hollander et al. |
| 2010/0131856 | A1* | 5/2010 | Kalbfleisch et al. .......... 715/741 |
| 2011/0087955 | A1* | 4/2011 | Ho et al. ........................ 715/230 |
| 2011/0184960 | A1 | 7/2011 | Delpha et al. |
| 2012/0036423 | A1* | 2/2012 | Haynes et al. ................. 715/230 |

OTHER PUBLICATIONS

U.S. Appl. No. 12/960,088, filed Dec. 3, 2010, Petts. et al., 'Annotations for Content Creation Feedback'.
Cohen, "Blurring the Lines Between Apps and Books", retrieved on Oct. 15, 2010 at <<http://www.nytimes.com/2010/10/25/business/media/25link.html?_r=3&nl=technology&emc=techupdateema3&pagewanted=print>>, The New York Times, Oct. 24, 2010, 0, 3 pages.
Non-Final Office Action for U.S. Appl. No. 12/960,088, mailed on May 22, 2013, James C. Petts et al., "Annotations for Content Creation Feedback," 19 pages.

* cited by examiner

*Primary Examiner* — Adam M Queler
(74) *Attorney, Agent, or Firm* — Lee & Hayes, PLLC (57) ABSTRACT

Techniques for use with an electronic book reader include receiving localized evaluative feedback from users, pertaining to different locations within electronic content. The localized feedback is collected at a server and reported to content creators in reports that are formatted to indicate characteristics of the feedback at different locations within the electronic content.

21 Claims, 11 Drawing Sheets

LOCALIZED FEEDBACK FOR CONTENT CREATION

BACKGROUND

For many years, information and ideas have been primarily distributed using print media such as books and periodicals. The primary indicator of how much readers or consumers like the content has been retail sales—it is assumed a high selling book is liked, and that a low selling book is not liked.

With the widespread use of the Internet and other communications technologies, however, it has become possible to distribute large, coherent units of media, such as books and periodicals, using electronic technologies. Consumer feedback can also occur in different ways, such as through blogs, email, and other forms of electronic and online communications.

Although the nature and capabilities of content distribution and electronic communication are changing, methods of soliciting and obtaining consumer feedback regarding electronic works have changed very little, and continue to rely in large upon sales-related data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques for receiving and displaying evaluative feedback from users. In accordance with these techniques, digital works such as electronic books (eBooks) and other electronic content items are distributed to consumers for rendering on eBook reader devices or other suitable electronic readers and devices. A user may provide feedback corresponding to specific locations within the electronic content. Feedback may be collected and aggregated from multiple users and reported in various ways to authors and other creators of digital content.

The feedback may consist of quantitative items or ratings, such as a number of points or "stars", or a binary "thumbs up/thumbs down" rating. Such quantitative ratings are individually quantifiable in that a discrete feedback value or score can be derived from each item of feedback. Quantitative ratings or evaluations such as this may vary in continuous or discrete steps between a "low" or "negative" level and a "high" or "positive" level.

Feedback may also consist of more subjective information, such as comments and annotations that are made at specific locations within an electronic book. This type of feedback is not individually quantifiable, in that it may be difficult to derive a specific value or score from a specific item of feedback. Subjective feedback such as this may be collectively quantifiable, however, by observing the volume of feedback received concerning different locations within an eBook. Corrections, such as typographical and grammatical corrections, may also be observed in this manner.

Example Environment

Figure 1:
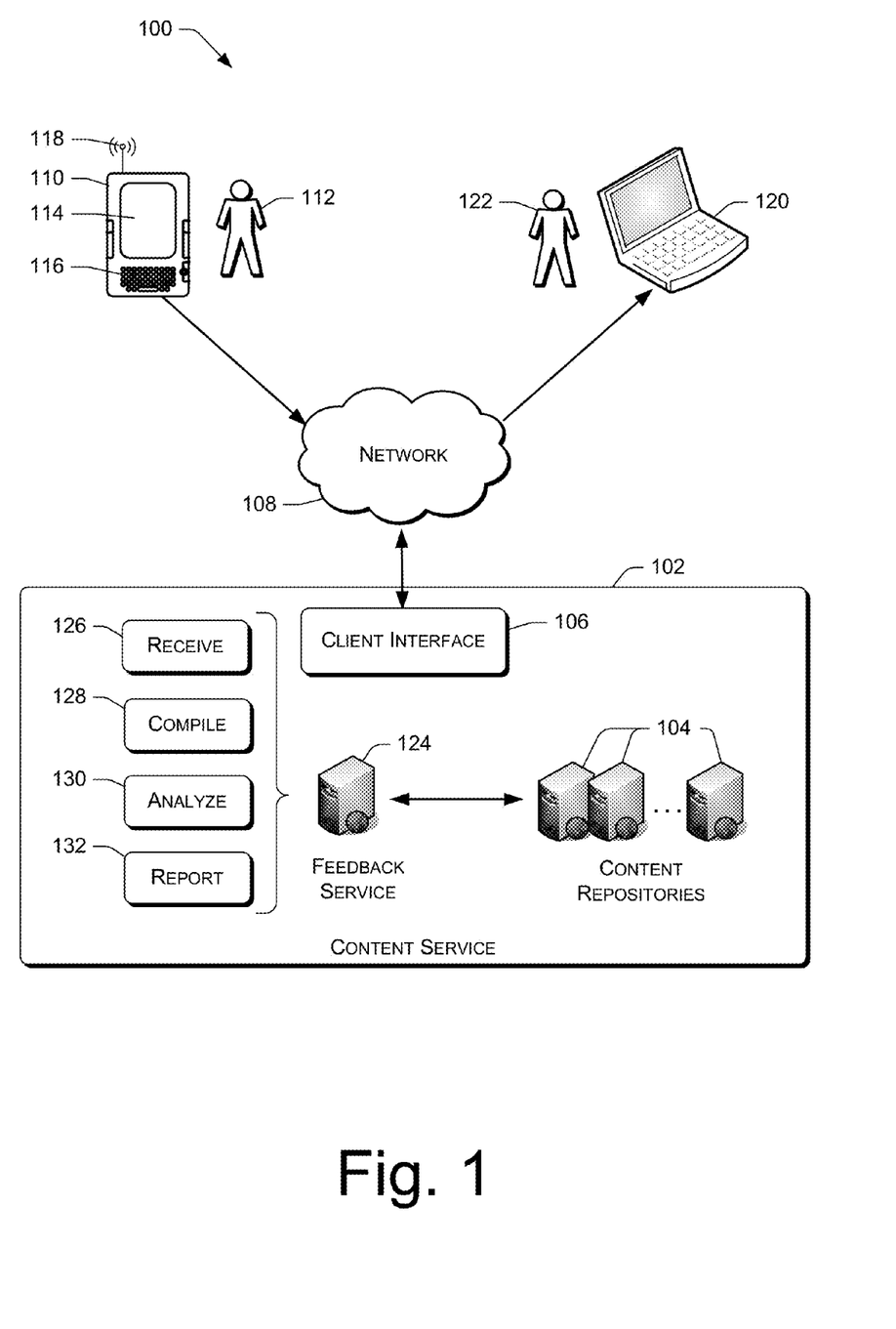
FIG. 1 is an illustrative architecture for distributing electronic content and reporting localized feedback to creators of the electronic content.

FIG. 1 shows an illustrative environment 100 configured to distribute eBooks and other digital or electronic content to human readers or consumers, also referred to herein as users. For discussion purposes, the architecture and techniques are described in an online context where content items are retrieved from an online service. However, the concepts described herein are also applicable in other architectures, such as offline environments.

The environment 100 has an online content service 102 from which content items can be purchased or otherwise obtained. The content service 102 includes content repositories or servers 104 that store content items such as eBooks. The terms "electronic document", "electronic book", and/or "eBook", as used herein, include electronic or digital representations of printed works, as well as digital content that may include text, multimedia, hypertext, and/or hypermedia. Examples of printed and/or digital works include, but are not limited to, books, magazines, newspapers, scholarly works and papers, journals, reference materials, telephone books, textbooks, anthologies, instruction manuals, proceedings of meetings, forms, directories, maps, web pages, etc. Accordingly, the terms electronic document, electronic book, and eBook may include any content that is in electronic or digital format.

The content service 102 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

The content service 102 may have a virtual storefront or other type of online client interface 106 for interaction with consumers and/or devices. The client interface 106 may expose a graphical, web-based user interface that can be accessed by human users to browse and obtain (e.g., purchase, rent, lease, etc.) content items such as eBooks and audio books. The client interface 106 may also expose programmatic interfaces that devices can use to obtain digital content items and to otherwise communicate with components of the content service 102. In the illustrated embodiment, the client interface 106 allows devices to obtain content items from the content repositories 104, and also allows devices to return feedback and other information to the content service 102.

The content service 102 may have wide-area network connectivity, allowing communication between the content service 102 and remote content consumption devices or readers. In the example of FIG. 1, the content service 102 communicates through a public network 108 such as the Internet. Other networks might be used, such as private networks, cellular networks, and other types of networks with wide geographical coverage. In practice, a combination of different types of networks and network technologies are often involved in communications between the content service 102 and remote consumption devices.

As an example, FIG. 1 shows a content consumption device 110, also referred to herein as an electronic reader 110, along with a human reader or user 112 of the content consumption device 110. The content consumption device 110 can be an eBook reader device dedicated to and specifically configured for rendering eBooks. Alternatively, the content consumption device 110 can comprise some other type of electronic reader, such as a cellular phone, a personal digital assistant, a personal music player, a tablet computer, a laptop computer, etc.

In this example, the content consumption device 110 is a handheld, portable device having a flat-panel display 114 upon which eBooks or other content can be displayed. The display 114 may be implemented with touch-sensitive technology that is responsive to user input registered via, for example, a finger, a stylus, or other similar pointing device. The eBook reader device 110 may also include a keyboard 116 or other types of actuatable elements that may have dedicated or assignable operations. For instance, the device 110 may have a power on/off button, selection keys, joystick, touchpad, and so forth. The touch-screen display 114 presents content items such as eBooks in a human-readable format to the user 112. The touch-screen display 114 may depict, for example, text of eBooks, along with illustrations, tables, or graphic elements that might be contained in the eBooks. In some cases, the eBooks may include multimedia components, such as video or audio. In such scenarios, the display 114 (or an additional display) may also be configured to present video, and the device 110 may be equipped with audio output components to play audio files.

In the particular embodiment illustrated by FIG. 1, the content consumption device 110 has a wireless communications receiver or transceiver 118, represented in FIG. 1 by an antenna symbol. The wireless communications receiver or transceiver 118 is configured to communicate wirelessly through the network 108 with the client interface 106 of the content service 102. The wireless communications receiver or transceiver 118 can be a wireless local-area or wide-area network receiver, transceiver, or port, configured to communicate through a local-area or wide-area network using conventional IP (Internet Protocol) and IP-related protocols for wireless network communications. Alternatively, the wireless communications receiver or transceiver 118 might be a cellular-based communications component or device such as used in mobile telephones or other personal communications devices. Various different types of technologies might alternatively be used for communications with the content service 102. The communications capabilities of the content consumption device 110 can be used to interact with the content service 102, for example to download content from the content service 102. The communications capabilities may also be used to submit information to the content service 102 as will be described below.

FIG. 1 also shows a report terminal 120 that can be used by a content creator 122 to receive and view reports based on feedback provided by users. The term "content creator" is used herein to reference a person or entity that has played some role in creating an eBook or other electronically-distributed content item. Creators of different content items might include authors, editors, translators, illustrators, artists, publishers, agents, and so forth.

The report terminal 120 represents any number of different types of devices that might be used to receive and render reports or other information to various creators of content items. In many cases, the report terminal 120 might comprise a personal computer or similar device having an Internet browser to receive reports via the public network 108.

Although only a single content consumption device and a single report terminal are shown in FIG. 1, it should be understood that these represent a plurality of such devices. Generally, multiple users 112 will consume multiple content items on multiple respective content consumption devices 110, and multiple creators 122 will receive multiple reports on multiple report terminals 120. Accordingly, the content consumption device 110, the user 112, the report terminal 120, and the content creator 122 will be referred to herein as either singular or plural, depending on the context.

Furthermore, content items and feedback reports as described herein may be used with various different types of devices, other than the devices shown. For example, the functionality of the content consumption device 110 might in many cases be implemented by electronic reader programs or applications running on general-purpose computing devices such as personal computers, tablet computers, personal digital assistants, smartphones, or other computer-like devices, many of which are capable of installing and executing applications or programs designated or provided by their users. More specifically, the content consumption and feedback functionality described herein might be provided by specialized software running on a computer or computing device that is not dedicated to or specially configured for rendering and consuming eBooks.

In the illustrated example, the content consumption device 110 is configured to accept localized evaluative feedback from the user 112. The feedback is said to be localized because it pertains to specific locations within an eBook. For example, the feedback might correspond to a particular section, chapter, page, paragraph, word, or letter of an eBook. The feedback is said to be evaluative because it conveys an evaluation of the eBook content at the specified location.

The feedback can take many forms. For example, an electronic reader may give a user the ability to select a thumb-up or thumbs-down input at any time when reading a book. The electronic reader may use this mechanism, when at a particular location within an eBook, to record a positive or negative rating pertaining to that location. The rating can be stored by the electronic reader, and indexed to the location at which the feedback was provided.

The electronic reader may accumulate many such ratings from the user with respect to a single eBook or many books. Assuming that the user has given appropriate permissions, the electronic reader may eventually transmit the ratings feedback to the content service 102, where it can be aggregated with feedback from other users and reported to content creators.

As another example, an electronic reader may implement some type of menu structure or other user interface element with which a user can interact to provide localized feedback. Using a mechanism like this, a user may provide simple binary ratings such as "like/dislike" or "thumbs-up/thumbs-down". A user may also be given the opportunity to provide more granular, non-binary ratings that range from low to high—such as by selecting from a scale of 1-10 or designating a number of "stars" or other graphic elements.

A user interface may also allow a user to make revisions to the text of content items. Such revisions may include typographical, spelling, and grammatical corrections. Corrections may be made by directly editing the text of a content item, in a format known as "redlining" in which individual additions and deletions are explicitly identified. Corrections and revisions may also be made using editing symbols or abbreviations, or by inserting comments describing the nature of the desired correction or revision.

More general annotations, such as suggestions, criticisms, answers to questions from content creators, and descriptions of supplemental or additional content may be made via textual comments associated with or inserted in particular locations within content items.

Ratings, corrections, comments, and other annotations such as these may correspond to a very specific location within an eBook, such as a particular character position. Alternatively, a user might select a particular word, phrase, or sentence from a content item and provide a rating or other feedback item that relates generally to the selected portion of the content.

As mentioned above, the described types of feedback may or may not be individually quantifiable. Simple binary ratings are individually quantifiable, as are ratings or judgments in which a user selects from a discrete or continuous measurement scale.

Other types feedback items, such as corrections, comments, and annotations, may not be individually quantifiable. However, these feedback items may be collectively quantifiable in terms of their volume with respect to individual locations within an eBook. For example, one location within an eBook may be highlighted by a large number of users, while another location may be underlined by relatively fewer users.

Different types of feedback may or may not be considered evaluative in different situations. Ratings are generally considered evaluative in that they express a judgment or opinion about a location within an eBook. Other types of numeric or voting-type feedback, such as storyline voting may or may not be considered evaluative.

Comments and other annotations may or may not be considered evaluative, depending on the situation and objectives. In some situations, the mere presence of a comment may imply a positive or negative evaluation, and the number or volume of such comments across many users may be considered an important evaluative factor.

The content service 102 has a feedback service 124 that receives feedback items from multiple users or consumers of content items. The feedback service 124 aggregates and compiles the feedback items and creates feedback reports for creators of content items. The feedback reports are made available at the client interface 106, and retrieved by the report terminals 120 for viewing by the content creators 122.

Each feedback report shows feedback for a particular content item, and is viewable by one or more content creators 122 of that content item. The feedback reports can be organized, formatted, and summarized in ways that are easily understood by the content creators 122. For example, the reports can be depicted as graphs or charts in two or more dimensions. A first dimension may indicate or correspond to location within the content item, while a second dimension may indicate or correspond to one of various different feedback scores that have been derived from compiled or aggregated feedback items. In some situations, different types of feedback scores may be shown on the same chart, such as ratings averages and feedback volume. The second dimension may be used to indicate one of these types of feedback scores, and the other type of feedback score may be depicted as a graphical property, such as color, shade, or pattern. Alternatively, a vertical axis might be used for two different data dimensions, and the different types of feedback scores may be combined on a two-dimensional bar chart.

Feedback reports can also be designed to show feedback along with the original text of a content item. For example, a report may visibly indicate localized feedback or feedback scores corresponding to different displayed locations of a content item, such as by displaying scores or graphics near the locations or by somehow marking, highlighting, or color coding the text of a content item to indicate the nature of feedback received regarding that text.

Some specific examples of feedback reports will be described below.

General functions performed by the feedback service 124 are indicated by blocks 126, 128, 130, and 132, corresponding to acts or actions performed by the feedback service 124 in certain embodiments.

One function performed by the feedback service 124, indicated at 126, comprises receiving feedback items from a plurality of users 112. The content consumption devices 110 are configured, either by dedicated functionality or by installed applications, to render content items and to allow users to provide localized feedback pertaining to the rendered content items. The localized feedback is then submitted to the feedback service 124 using the client interface 106 of the content service 102. Each feedback item is associated with information indicating the location or portion within a content item to which the feedback item pertains. The location may be identified as an absolute position, a word, a phrase, a paragraph, a page, a chapter, and so forth. Furthermore, locations within content items may be specified using some type of invariant referencing. This allows specification of a location within a digital work in a manner that does not vary with screen size, font type, font size, or other variations in display conditions of the digital work. For example, absolute location might be specified by character count from the beginning of a textual item.

In the illustrated embodiment, the feedback service 124 is also configured at 128 to compile or aggregate feedback items from different users. The feedback service 124 receives and stores the feedback items in a local database in which the feedback items are indexed by content item and by portion or location of content item. For example, a particular feedback item is identified as pertaining to a particular content item and to a particular location within that content item.

The feedback service 124 is configured at 130 to analyze the received and aggregated evaluative feedback from multiple human readers to generate localized feedback scores corresponding to locations within particular electronic books or content items. The nature of the feedback scores will depend on the nature of the feedback received. For example, if users provide localized ratings, the received ratings might be averaged across the multiple users to provide localized average ratings corresponding to different locations within the electronic content. Localized feedback scores may correspond to evaluative values received from users, as well as more indirect factors, such as the volume of feedback items received. Multiple types of feedback scores may be used in some situations. For example, a first type of feedback score may be based on received feedback values (such as ratings), while a second type of feedback score may be based on the volume of received feedback.

In the illustrated embodiment, the feedback service 124 is also configured at 132 to report collected feedback to the content creators 122, in one or more formats that indicate the localized feedback scores for different locations within the electronic content. Reports may be provided through the client interface 106 of the content service 102, and retrieved by the report terminal 120 upon demand. For example, one of the content creators 122 might use an Internet browser to open a web site provided by content service 102 to display a report. Other delivery mechanisms are also possible, such as by embedding reports in emails that are sent periodically to one or more of the content creators 122.

Although FIG. 1 illustrates distribution of feedback reports to content creators, feedback may in some cases be made available to other users 112, either by way of feedback reports or by showing feedback of other users within the original content itself.

Reader Interface Examples

Figure 2:
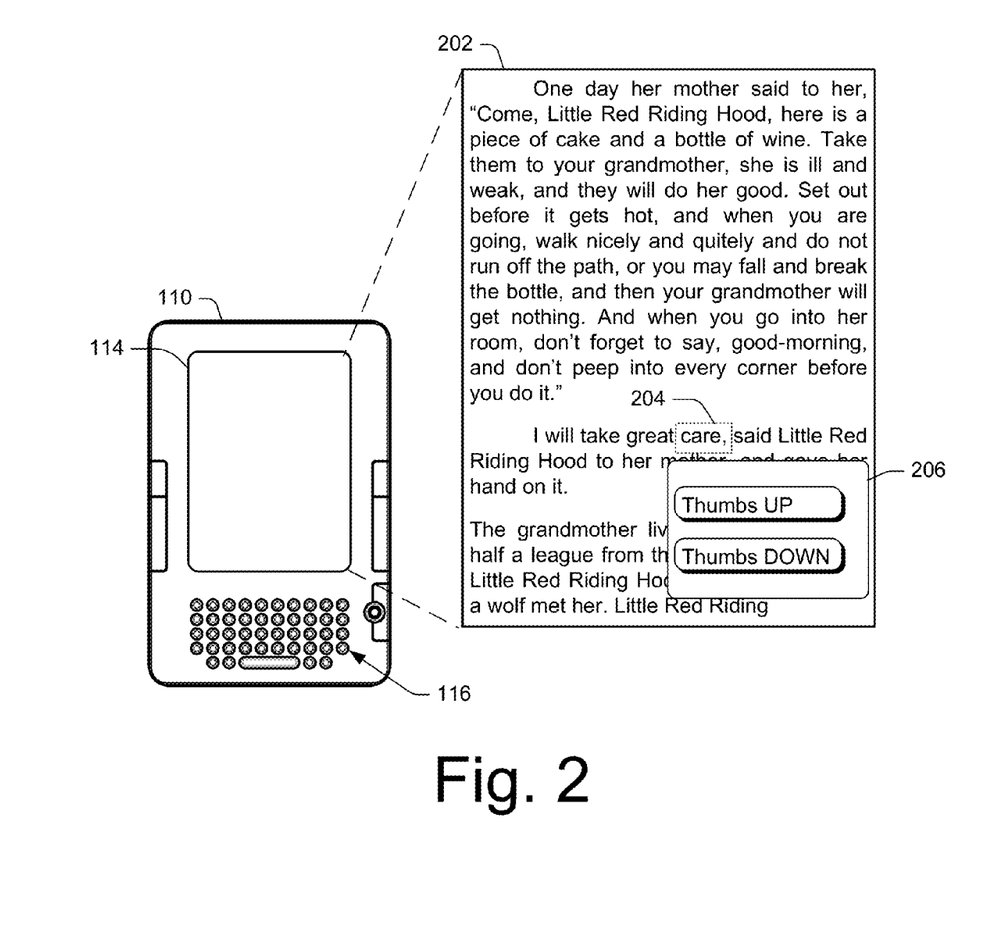
FIGS. 2 and 3 show user interface examples in which a user may provide localized feedback pertaining to electronic content.

FIG. 2 shows an illustrative user interface that enables a user to provide feedback pertaining to a location within an eBook. FIG. 2 shows the content consumption device 110 and a screen example 202 that can be displayed by the content consumption device 110. In this example, the user has navigated to the word "care" within the displayed page of content. This can be done in different ways in different embodiments. In some embodiments, a user may interact with the keypad 116 of the content consumption device 110 to move an on-screen cursor or highlight to the word "care". In other embodiments, this type of navigation may be accomplished by touching the screen itself. Cursor control devices such as computer mice may be used in other embodiments.

A currently selected word or portion may be indicated by highlighting, such as by a rectangular selection indicator 204 that surrounds the selected text. Highlighting may alternatively be in the form of underling, color change, blinking text, and/or the like. In different embodiments, a user may be able to select a character or character position, a word, a line, a paragraph, a page, and so forth. Current location within a displayed page may also be indicated by a cursor rather than highlighting. The current location may alternatively be considered to be the current page that is being displayed, rather than a particular point within the page.

In the embodiment of FIG. 2, selecting a word or some other location within the displayed eBook page causes the content consumption device 110 to open and display an option menu 206, containing choices that the user may select in order to provide a rating. In this case, the user can select from either "Thumbs UP" or "Thumbs DOWN" to create a simple binary feedback item. The different options can be selected or activated by touching, by moving a cursor and clicking, or by other means.

Note that functionality like this can be implemented in different ways, such as by different types of menu structures or by using dedicated hardware keys allowing the user to specify positive or negative evaluations corresponding to the current reading location within the electronic content.

Figure 3:
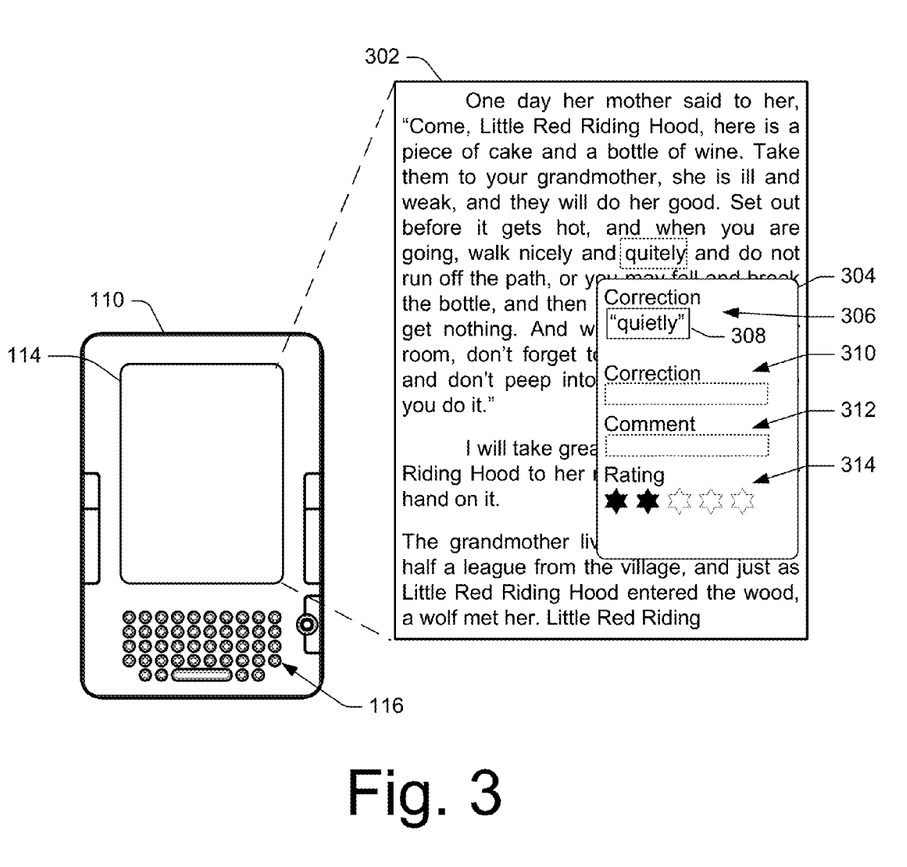

FIG. 3 shows a different example of a user interface that enables a user to provide feedback pertaining to a location within an eBook. FIG. 3 shows the content consumption device 110 and a screen example 302 that can be displayed by the content consumption device 110. In this example, the user has navigated to the misspelled word "quitely" within the displayed page of content.

In this embodiment, selecting a word or some other location within the displayed eBook page causes the content consumption device 110 to open and display a contextually-sensitive menu 304, indicating different evaluative feedback that can be designated by the user at the current location within the electronic content. In this example, the contextually-sensitive menu 304 shows various options relating to feedback. In other embodiments, however, the options may also include other actions, such as options to allow the user to lookup the highlighted word in a dictionary. Generally, a contextually-sensitive menu presents varying options that are applicable at any time to the specific situation.

In this case, the contextually-sensitive menu 304 has options allowing the user to correct the highlighted word, to comment on the highlighted word, and/or to rate the rendered content item at the highlighted location.

More specifically, the contextually-sensitive menu 304 has a first option 306 that allows the user to select from corrections previously supplied by different users with respect to the highlighted word. In this case, other users have submitted corrections to the highlighted word, indicating the correct spelling "quietly". The user can select this same correction from the context menu 304 by selecting the button 308 containing the word "quietly." In different situations, users might have submitted several different corrections to this word, all of which might be shown as separate selections so that the current user can select the one that he or she wishes to submit.

The contextually-sensitive menu 304 also has a second option 310 that can be used to submit corrections. In this case, a correction can be submitted by typing it into the provided text entry box. Auto-fill technologies can be used here to propose or suggest text based on the first few letters typed by the user. Automatic suggestions may be based on previous corrections supplied by other users.

The contextually-sensitive menu 304 has a third option 312 that can be used to submit a comment pertaining to the currently specified location within the displayed content. Specifically, a comment can be submitted by typing it into the provided text entry box. Auto-fill technologies can also be used to offer suggestions based on comments previously supplied by the user or by other users.

The contextually-sensitive menu 304 has a fourth option 314, which allows a user to provide a rating corresponding to the current or highlighted location within the displayed electronic content. In this example, the rating can be supplied by selecting a number of graphically-represented stars, to represent a numerical rating. For example, a user might give a four-star rating, which would be considered relatively higher than a two-star rating.

Note that FIG. 3 gives examples of different types of user input mechanisms, and while these examples may be used as shown they may also be used in different combinations or replaced with different types of user input mechanisms.

Selecting any of the options illustrated in FIGS. 2 and 3 may cause the content consumption device 110 to submit the provided feedback to the feedback service 124 via the network 108. Corrections and other feedback may be submitted from consumption devices immediately, at periodic intervals, or at available opportunities such as when communication components are active. In addition, the user may be prompted for permission before feedback. Further, while FIG. 3 illustrates several examples forms of feedback, other embodiments may allow users to provide additional or different forms of feedback, and may provide a greater or lesser number of different feedback options.

Report Examples

Figure 4:
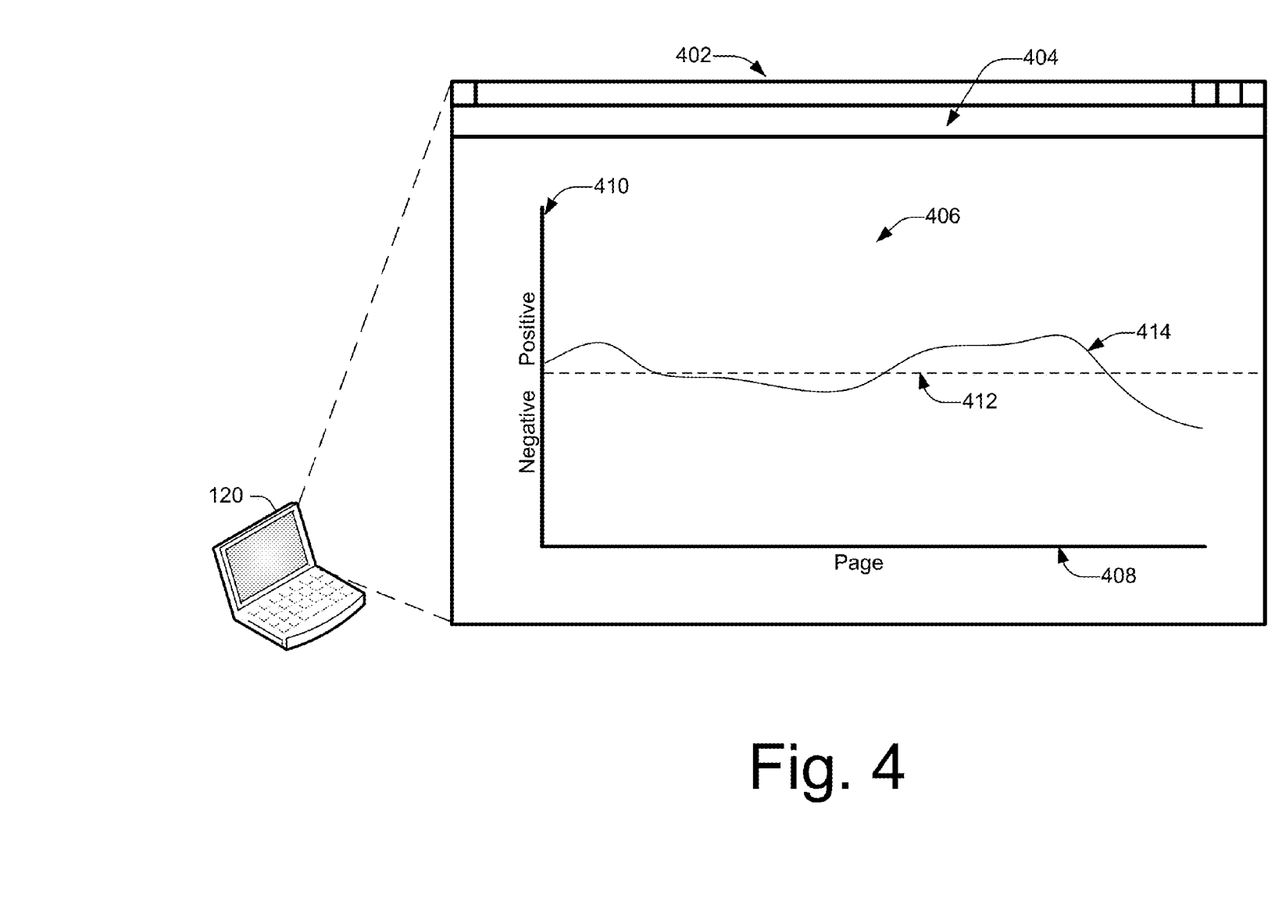
FIGS. 4-7 show user interface examples for reporting feedback to creators of electronic content.

FIG. 4 shows an example of how feedback reports might be compiled and shown to one or more of creators 122. In this example, a browser application 402 has been used to open a web site containing a feedback report 404. The feedback report 404 in this example depicts a line graph 406.

The line graph 406 has a horizontal axis 408 that corresponds to pages or other locations of a content item. In some cases, the horizontal axis corresponds to page numbers that increase from left to right.

The line graph 406 also has a vertical axis 410 that corresponds to feedback scores. A dashed horizontal line 412 indicates neutral feedback. Feedback scores above line 412 are positive. Feedback scores below line 412 are negative. A feedback score line 414 indicates scores corresponding to different locations (in this case pages) of the electronic content.

The feedback scores are based on or derived from any feedback received from users as described above, and correspond to specific locations, such as pages, within the content item.

Figure 5:
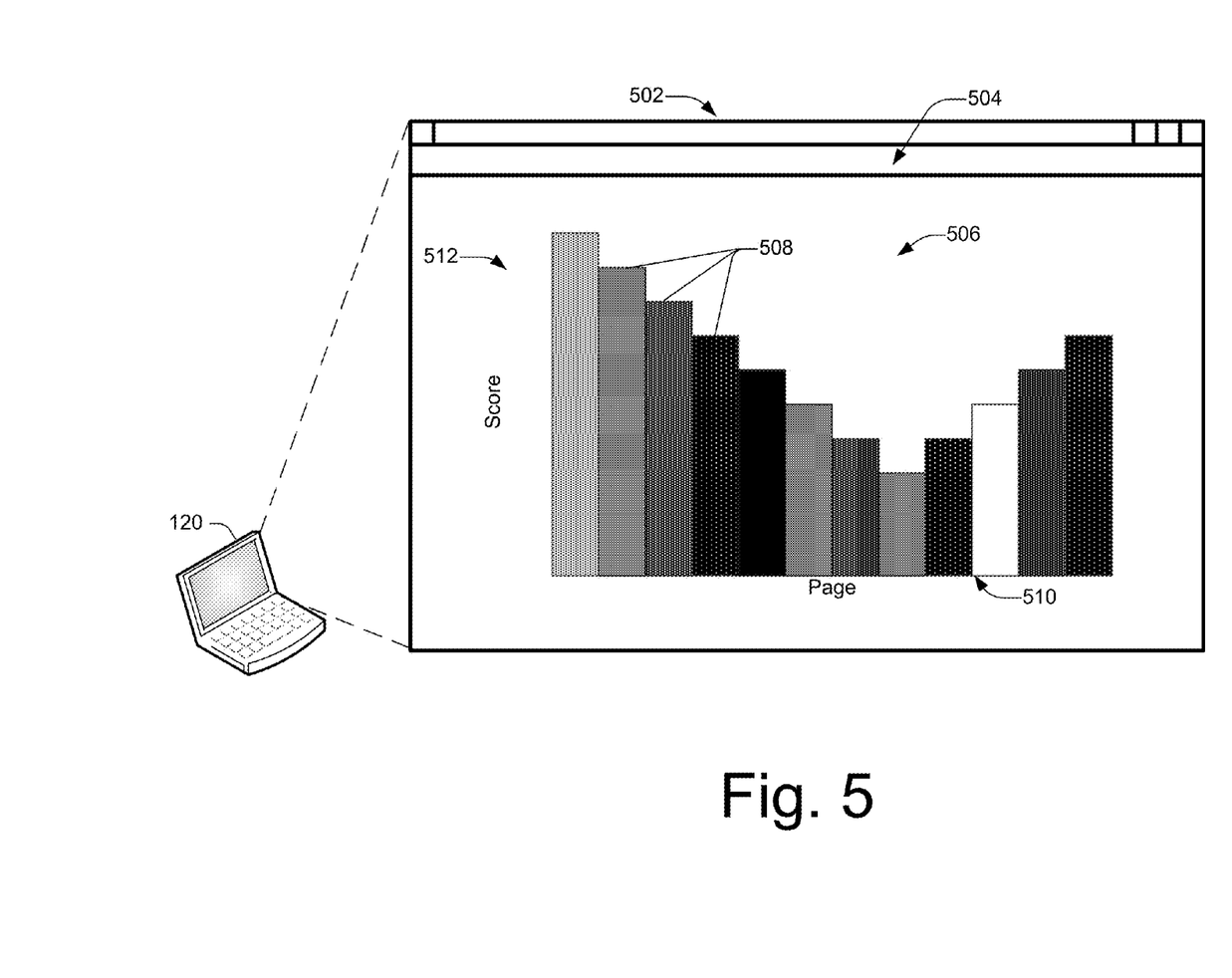

FIG. 5 shows another example of how feedback reports might be compiled and shown to one or more of creators 122. In this example, a browser application 502 displays a feedback report 504, which in this example comprises a bar chart 506. The bar chart 506 has bars 508 corresponding to different locations within the electronic content. For example each bar may represent a range of pages or a chapter. The horizontal axis 510 of the bar chart 506 thus corresponds to location within the electronic content.

The vertical axis 512 of the bar chart may correspond to values of feedback items. The values may be averaged over many users and over the content range represented by each particular bar 508. Thus, in the case where users provide ratings, the vertical axis may correspond to the average values of those ratings at specific locations.

In some cases, different types of feedback scores may be available, and it may be desired to indicate more than one type of feedback score on the feedback report 504. In the example shown, the color of each bar 508 may be varied to indicate a second type of feedback or feedback score. Varying colors are represented in FIG. 5 by different fill patterns. As an example, a first type of feedback score, corresponding to ratings (referred to as rating scores or value scores), may be indicated by the heights of bars 508. A second type of feedback score (referred to as volume scores), corresponding to volume of received feedback, may be indicated by the color of bars 508. The report may depict both of these scores relative to locations within the electronic content.

For example, it may be desired to indicate the volume of feedback, such as the number of discrete comments or corrections received, for each portion of the electronic content. The color of each bar may be varied to indicate different levels of feedback volume. Again, while FIGS. 4 and 5 illustrate example manners of surfacing the compiled feedback to content creators, other embodiments may provide this information to the content creators in any other manner, graphically or otherwise.

Figure 6:
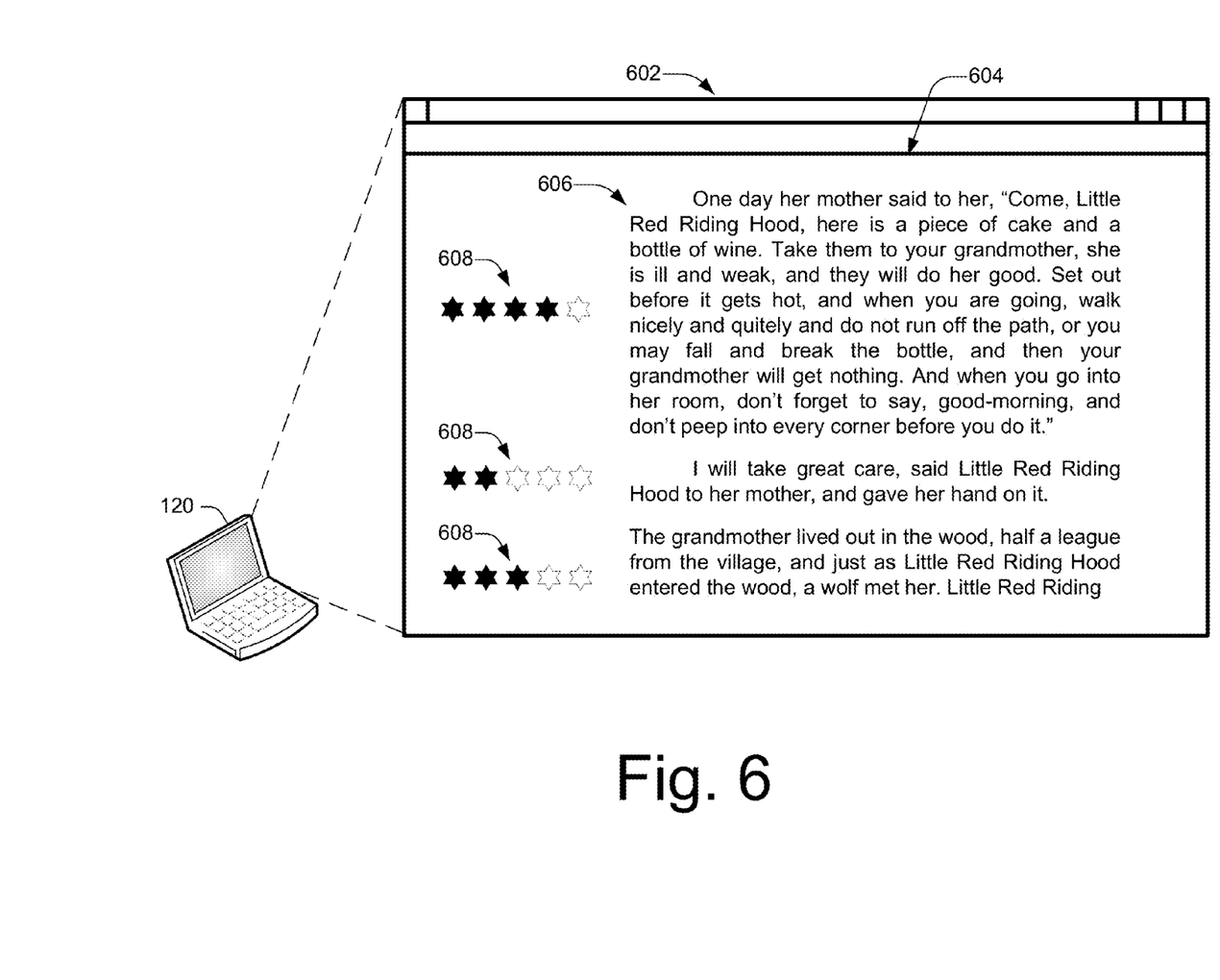

FIG. 6 illustrates a different way of formatting feedback reports. In this example, a browser application 602 displays a feedback report 604, which shows the text of a portion 606 of the content item for which feedback has been received. In this example, it is assumed that the received feedback is in the form of non-binary ratings, such as 0-5 star ratings. An average star rating 608 is shown to left and adjacent each paragraph of the portion 606 of the content item. The average star ratings 608 visibly indicate localized feedback scores corresponding to different locations. In this example, a start rating is associated with each paragraph, and indicates the localized feedback or feedback score corresponding to that paragraph.

Other information might be shown in addition to the star ratings 608, such as the number of users who submitted feedback for each paragraph. Ratings might also be indicated in different ways such as by numeric scores or different graphical indicators. Furthermore, feedback might be given for different units of the content, such as for pages, sentences, or words.

Other types of feedback could be presented in a similar fashion. Thumbs-up and thumbs-down graphics could be presented in place of the star ratings when feedback is received in that format. Various graphics and graphic elements might be used to illustrate different types of feedback metrics, such as graphs, colors, icons, etc.

Figure 7:
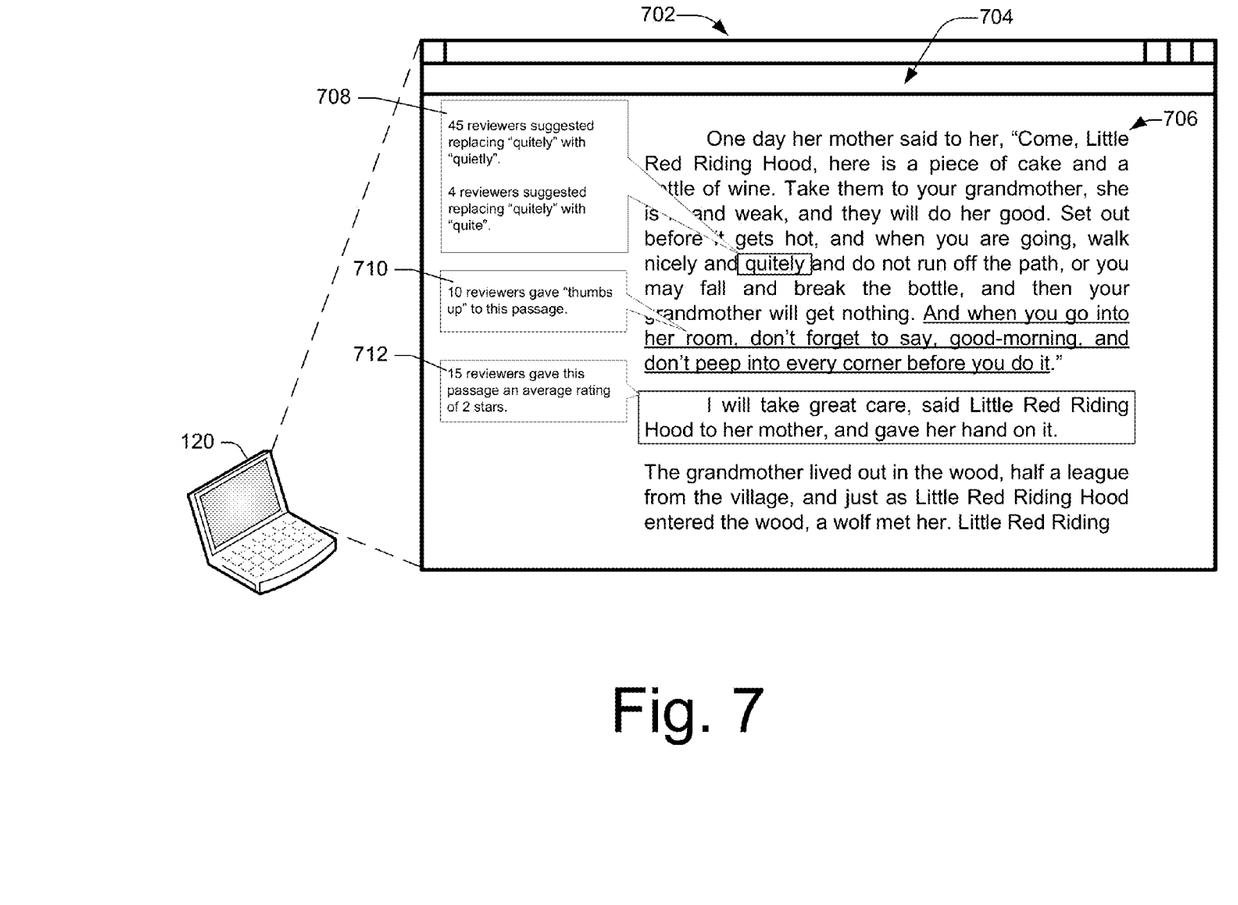

FIG. 7 illustrates an example of how feedback can be reported at a word, sentence or phrase level, by variably highlighting text to indicate localized feedback and/or feedback scores. In this example, a browser application 702 displays a feedback report 704, which shows the text of a portion 706 of the content item for which feedback has been received. The text itself is highlighted or otherwise marked to indicate feedback scores or other characteristics of feedback applicable to the highlighted text. The markings can be varied to indicate ranges of feedback scores. Colors may be varied, as an example, to indicate ranges of ratings or scores, with highlight colors being continuously varied over a range indicating varying feedback scores. Colors may vary by intensity, brightness, saturation, transparency, shade, or hue, and can include grayscale colors.

For purposes of illustration, text in FIG. 7 is variably marked by underlining and by highlighting (represented by rectangular boxes). In this example, underlining indicates positive feedback and highlighting indicates negative feedback.

The misspelled word "quitely" is underlined in FIG. 7 to indicate negative feedback. In this example, a text balloon 708 may be associated with the highlighting to explain the nature of the negative feedback, in this case indicating that "45 reviewers suggested replacing 'quitely' with 'quietly'" and that "4 reviewers wrongly suggested replacing 'quitely' with 'quite'".

The sentence beginning with "And when you go . . . " is underlined, indicating positive feedback that was received regarding this sentence. A text balloon 710 may accompany the underlining to indicate the nature of the feedback. In this case, "10 reviewers gave 'thumbs up' to this passage". The paragraph beginning with "I will take great care . . . " is highlighted, indicating negative feedback. In this case, an accompanying text balloon 712 indicates that "15 reviewers gave this passage an average rating of 2 stars," which in this example is considered a relatively low rating.

Although FIG. 7 shows an example of how feedback marking and reporting might be performed, many other marking techniques can be used for providing this type of feedback to content creators.

In the examples given above, feedback may optionally be filtered based on various factors. In some cases, certain types of creators will be interested in different types of feedback. Authors, for example, may be less interested in typographical corrections and may wish to filter their feedback reports to omit this type of feedback.

In other cases, feedback may be filtered based on its sources. For example, it may be possible for a content creator to limit viewed feedback to that originating from only certain types of classes of reviewers, such as those specifically designated or those with high qualifications or online reputations.

Example Client and Server Configurations

Figure 8:
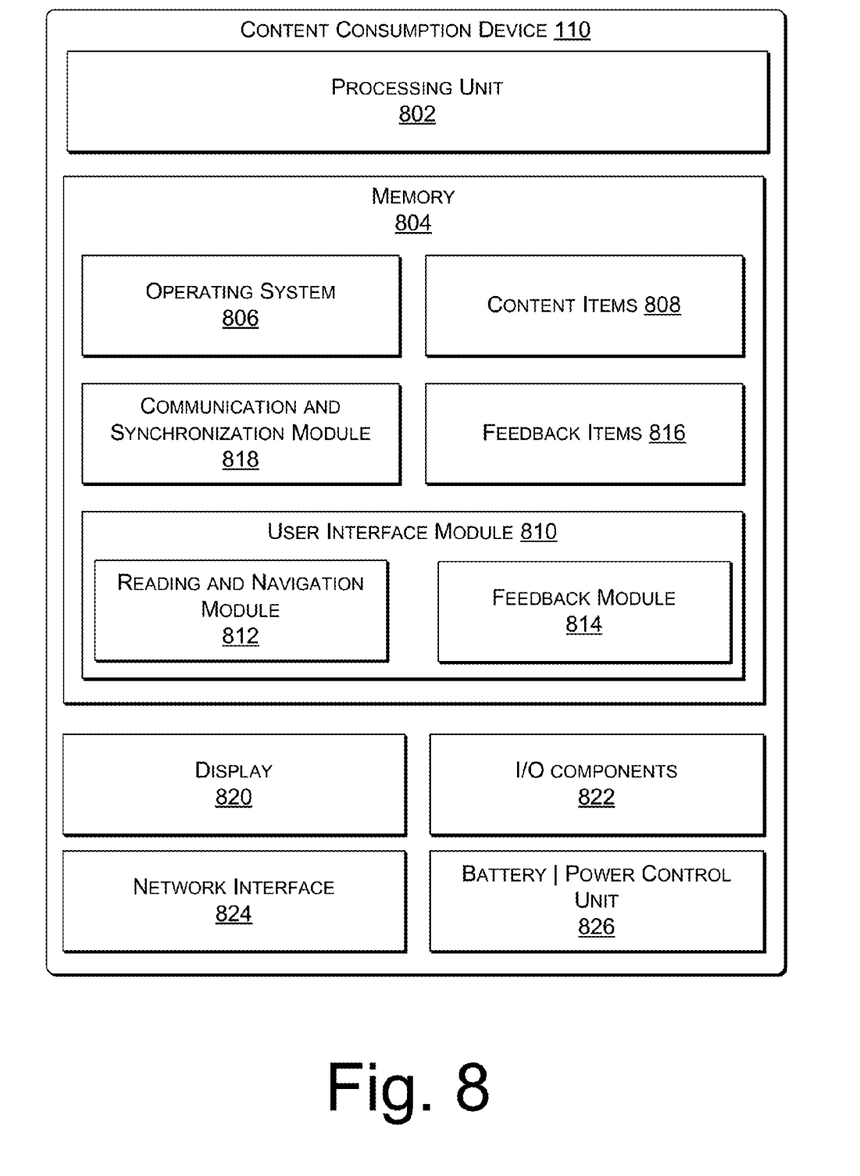
FIG. 8 is a block diagram illustrating selected modules of a content consumption device.

FIG. 8 illustrates relevant components that might be implemented in the content consumption device 110. In FIG. 8, it is assumed that the content consumption device 110 is a dedicated, handheld eBook reader device equipped with a display to display eBooks. Other embodiments, however, may employ any other type of content consumption device as discussed above.

In a very basic configuration, the content consumption device 110 includes a processing unit 802 composed of one or more processors, and memory 804. Depending on the configuration of the content consumption device 110, the memory 804 may comprise computer storage media and may include volatile and nonvolatile memory. Thus, the memory

804 may include, but is not limited to, RAM, ROM, EEPROM, flash memory, or other memory technology, or any other medium which can be used to store media items or applications and data which can be accessed by the content consumption device 110.

The memory 804 may be used to store any number of functional components and/or operational logic modules that are executable on the processing unit 802, as well as data and media items that are rendered by the content consumption device 110. Thus, the memory 804 may store an operating system 806 and an eBook storage database to store one or more content items 808, such as eBooks and audio books.

A user interface module 810 may also be provided in the memory 804 and executed on the processing unit 802 to provide for user operation of the content consumption device 110. The user interface module 810 in this example may include a reading and navigation module 812 that provides menus and other navigational tools to facilitate selection and rendering of the content items 808. This may include a browser or other application that facilitates access to sites over a network, such as websites or online merchants, or other sources of electronic content items or other products.

The user interface module 810 may also include a feedback module 814 that is configured as operating logic to perform many of the processes described herein. The feedback module 814 interacts with the user 112 and enables the user to create and enter feedback within a content item that is being rendered by the content consumption device 110. The feedback module 814 may accept feedback from the user 112 and store it in the memory 804. Stored feedback is shown in FIG. 8 as feedback items 816. Feedback items 816 may have links or pointers to specific content items 808 to which they pertain, and to specific locations within such content items.

A communication and synchronization module 818 is stored in the memory 804 and executed on the processing unit 802 to perform management functions in conjunction with the content repositories 104 (FIG. 1). Communication and synchronization module 818 communicates with the content service 102 to receive content items 808 and with the client interface 106 to report feedback items made by individual users 112 on respective content consumption devices 110.

The content consumption device 110 may further include a display 820 upon which electronic books and other content items are rendered. In one implementation, the display uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The content consumption device 110 may further be equipped with various input/output (I/O) components 822. Such components may include various user interface controls (e.g., buttons, joystick, keyboard, etc.), audio speaker, connection ports, and so forth.

A network interface 824 may support both wired and wireless connection to various networks, such as cellular networks, radio, WiFi networks, short range networks (e.g., Bluetooth), IR, and so forth. The network interface 824 facilitates receiving electronic books and other content as discussed herein. Of particular note, the network interface 824 enables wireless delivery of the content items 808 over a wireless network.

The content consumption device 110 may also include a battery and power control unit 826. The power control unit operatively controls an amount of power, or electrical energy, consumed by the content consumption device 110. Actively controlling the amount of power consumed by the device may achieve more efficient use of electrical energy stored by the battery.

The content consumption device 110 may have additional features or functionality. For example, the content consumption device 110 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 9:
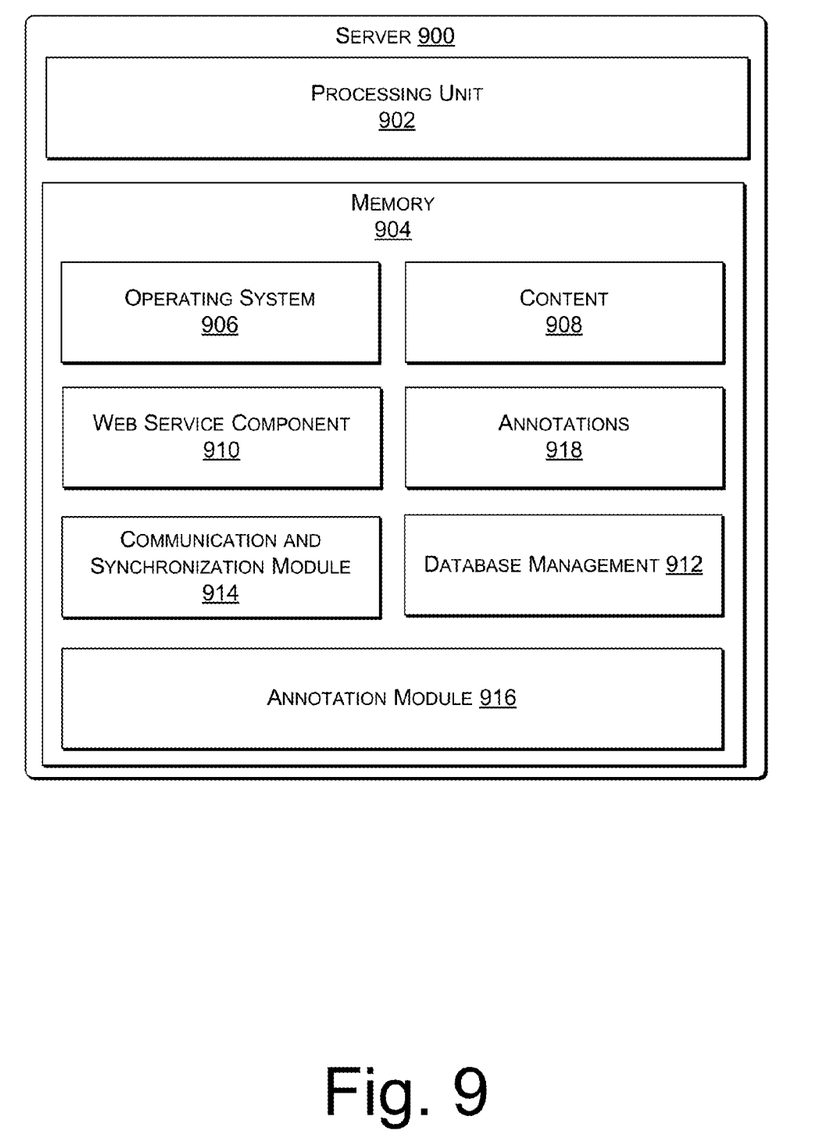
FIG. 9 is a block diagram illustrating selected modules of a server that may be used to implement feedback service functionality described herein.

FIG. 9 illustrates relevant components of a server 900 that may be used to implement the functionality of the content service 102. Generally, the content service 102 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. For purposes of discussion, the functionality of content service 102 is described as being implemented by the single server 900.

In a very basic configuration, the example server 900 might comprise a processing unit 902 composed one of one or more processors, and memory 904. The memory 904 may comprise computer storage media and may include volatile and non-volatile memory. Thus, the memory 904 may include, but is not limited to, RAM, ROM, EEPROM, flash memory, or other memory technology, or any other medium which can be used to store media items or applications and data which can be accessed by the server 900.

The memory 904 may be used to store any number of functional components that are executable on the processing unit 902, as well as data and content items that are supplied to consuming devices such as the eBook reader device 110. Thus, the memory 904 may store an operating system 906 and a content storage database 908 to store one or more content items such as eBooks.

Functional components of the server 900 may also comprise a web service component 910 that interacts with remote devices such as computers and content consumption devices. The client interface 106 may be implemented by the web service component 910, for example.

The server 900 may also include various database management components 912 for keeping track of users, purchases, etc. The server 900 may also include a communication and synchronization module 914 to communicate with remote consumption devices, to communicate any purchased electronic content to those devices, and to receive feedback items from content consumption devices.

The server 900 may include a feedback module 916 that is configured as operating logic to perform the processes described above with reference to blocks 126, 128, 130, and 132 of FIG. 1, and to implement other server feedback functionality described herein, such as described with reference to FIG. 10, below.

The server 900 may of course include many other logical, programmatic, and physical components, of which those shown in FIG. 9 are merely examples that are related to the discussion herein.

Example Method

Figure 10:
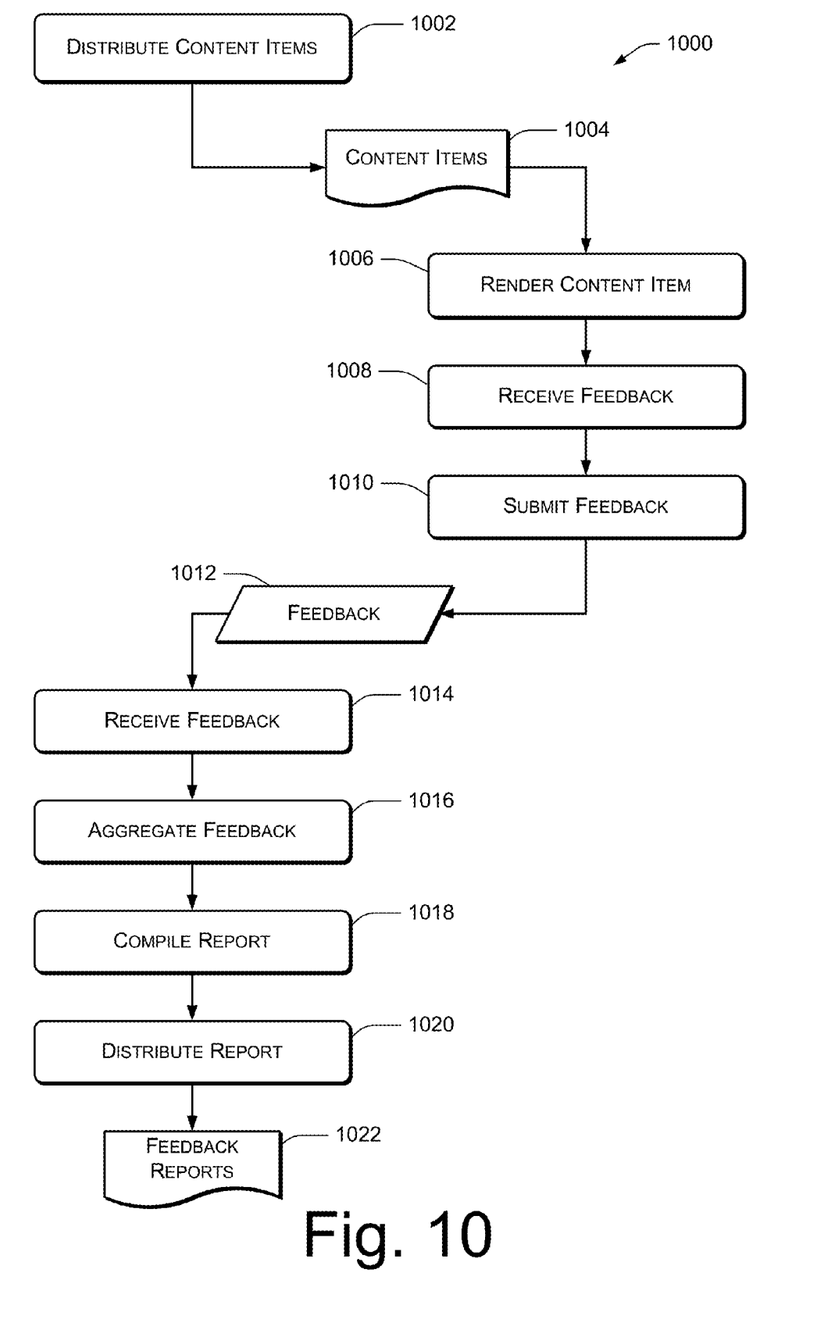
FIGS. 10 and 11 are flow diagrams of illustrative processes in accordance with the techniques described herein.

FIG. 10 illustrates an example method 1000 in accordance with the techniques described above. The method 1000 is described as being implemented in conjunction with the content consumption device 110 and a server 900 as described above. However, it should be understood that the method 1000 may be implemented using other suitable devices and architectures. Actions performed by the server 900 are shown on the left side of FIG. 10, while actions performed by the content consumption device 110 are shown on the right.

The method 1000 begins at 1002, at which one or more content items 1004, such as eBooks, are distributed to one or more content consumption devices 110, for eventual rendering on the content consumption devices 110. The content items 1004 may be distributed from the content service 102 and may be stored in memory 804 of the content consumption devices 110. Although wireless or network-based distribution is used in many embodiments, other forms of distribution might also be used, such as distribution on physical media.

As described above, individual content items are associated respectively with various content creators, including authors, translators, publishers, editors, and so forth.

Distribution 1002 may be part of a normal release of a digital work such as an eBook, where consumers purchase the eBook for consumption and provide evaluative feedback at will. In this case, consumers may use the feedback features described herein as an optional enhancement to their reading experience. In other cases, distribution 802 might constitute a special or limited release, such as a pre-publication release to a selected group of pre-publication reviewers, for the explicit purpose of obtaining feedback and corrections from specifically targeted users.

In some cases, the distribution 1002 may include selecting human readers to receive particular content items based on the qualifications and/or reputations of those readers. Qualifications may include general qualifications such as editorial expertise, or may include more specific qualifications relating to particular content items. For example, qualifications may include expertise in the subject matter of a content item, or membership in the author's fan club or some other group. In some cases, consumers may be given early access to content items on the condition that they provide feedback and ratings as described above. Failure to provide such feedback and ratings may result in a loss of privileges.

Reputation may be judged from various online activities and data, such as how an individual reviewers' feedback has been received, accepted, or rated by others. Reputation may be calculated using other indicia, such as whether the reviewer has read related content, the amount of feedback the reviewer has submitted in the past, whether the feedback was implemented by creators, whether the reviewer's feedback correlates with other reviewers, and so forth.

At 1006, a particular content item is rendered on the content consumption device 110 for consumption by the user 112. Navigation within the content item is facilitated by the reading and navigation module 812 (FIG. 8) of the content consumption device 110.

At 1008, the user provides localized evaluative feedback items regarding the rendered content, and the feedback module 814 of the content consumption device 110 captures and stores the feedback items. Each feedback item references or pertains to a particular part of or location within the rendered content, and may be explicitly correlated to that part or location of the rendered content.

At 1010, the communication and synchronization module 818 of the content consumption device 110 transmits the feedback items, referenced in FIG. 10 by reference numeral 1012, to the feedback service 124, via the client interface 106 of the content service 102. The transmitting may be performed automatically, without further initiation by the user, in response to accepting feedback items from the user. Alternatively, the transmitting may be performed upon specific request by a user, or after prompting the user for permission to perform the transmitting.

At 1014, the feedback service 124, implemented by one or more servers such as server 900, receives the feedback items 1012 and stores them. The feedback items 1012 are associated and correlated respectively with particular locations within or parts of individual content items. More specifically, each feedback item may reference or be associated with a particular content item and a particular location within that content item.

At 1016, the feedback module 916 aggregates the feedback items to produce feedback scores corresponding to different locations within the content item. In some implementations, it may be desirable to weight feedback in accordance with the reputations or qualifications of the users from which the feedback was received.

At 1018, the feedback module 916 compiles the aggregated feedback associated with the parts of a particular content item, and prepares or formats a report for one or more of the content creators 122. Example of such reports are shown in FIGS. 4-7. However, feedback reports may be presented in many different formats and might include many different types of information.

At 1020, the compiled feedback items are reported by distributing feedback reports 1022 to at least one of the content creators 122. Reports may be distributed in many different ways, such as by website or email.

The reporting 1020 may be performed periodically, to produce reports of feedback received during different time periods. The feedback reports 1022 may be provided to the content creators 122 without specific request, such as by email, or in response to specific activity or requests by the content creators, such as in the case where a content creator visits a website through which feedback reports are displayed.

Figure 11:
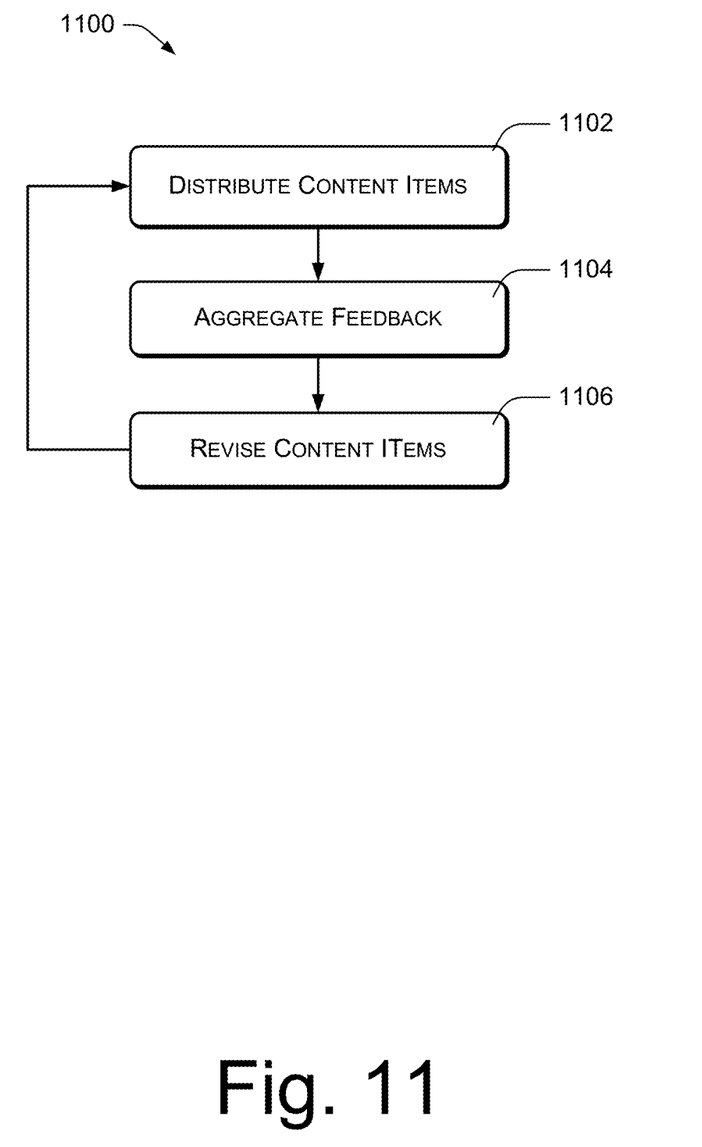

FIG. 11 illustrates a further example of how feedback might be used. A process 1100, performed by a server or service, distributes content items to various users and/or reviewers at 1102. Feedback is received and aggregated at 1104. At 1106, the feedback is incorporated into the original content items in a fashion similar to that shown in FIGS. 6 and 7. The content is then redistributed to users at 1102. In some embodiments, users may opt in to a program for receiving such updated content. In other embodiments, such redistribution may be limited to selected users based on interest or other factors.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method comprising:
under control of one or more processors configured with executable instructions,
distributing electronic books for rendering by electronic book readers, the electronic books having respective content creators;
receiving evaluative feedback from multiple human readers via the electronic book readers, the evaluative feedback corresponding to locations within the electronic books, the evaluative feedback comprising an evaluation of a portion of content at each of the locations within the electronic books;
analyzing the received evaluative feedback from the multiple human readers to generate localized feedback scores corresponding to the locations within the electronic books; and
reporting the localized feedback scores to at least one of the content creators of an individual electronic book in a format that indicates the localized feedback scores for different locations within the individual electronic book.

2. The computer-implemented method of claim 1, wherein the localized feedback scores are based on volume of evaluative feedback received.

3. The computer-implemented method of claim 1, wherein the localized feedback scores are based on values of the received evaluative feedback.

4. The computer-implemented method of claim 1, wherein the localized feedback scores are based on both (a) values of the received evaluative feedback and (b) volume of the evaluative feedback received.

5. The computer-implemented method of claim 1, wherein the format includes:
a first axis that represents location within the individual electronic book; and
a second axis that represents the localized feedback scores.

6. The computer-implemented method of claim 1, wherein:
the localized feedback scores include (a) value scores and (b) volume scores; and
the reporting comprises depicting both the value scores and the volume scores relative to locations within the individual electronic book.

7. The computer-implemented method of claim 1, wherein the reporting comprises visibly indicating localized feedback scores corresponding to different locations within the individual electronic book.

8. The computer-implemented method of claim 1, wherein the reporting comprises variably highlighting text within the individual electronic book to indicate localized feedback scores.

9. The computer-implemented method of claim 1, wherein the reporting comprises variably highlighting text within the individual electronic book with different colors as a function of the localized feedback scores.

10. The computer-implemented method of claim 1, wherein the evaluative feedback comprises corrections.

11. The computer-implemented method of claim 1, wherein the evaluative feedback comprises comments.

12. The computer-implemented method of claim 1, wherein the evaluative feedback comprises non-binary ratings from low to high.

13. The computer-implemented method of claim 1, wherein the evaluative feedback comprises binary ratings.

14. A computer-implemented method comprising:
under control of one or more processors configured with executable instructions,
receiving evaluative feedback from human readers pertaining to locations within electronic books;
aggregating the evaluative feedback pertaining to a particular electronic book from a plurality of the human readers;
correlating the aggregated feedback with locations within the particular electronic book, the aggregated feedback including first feedback based on received feedback values for each of the locations within the particular electronic book and second feedback based on a volume of received feedback for each of the locations within the particular electronic book; and
reporting the aggregated and correlated feedback to a creator of the particular electronic book.

15. The computer-implemented method of claim 14, wherein the reporting comprises:
depicting a first dimension corresponding to locations within the particular electronic book; and
depicting a second dimension corresponding to the correlated and aggregated feedback.

16. The computer-implemented method of claim 14, wherein the reporting comprises visibly marking locations within the particular electronic book to indicate the correlated and aggregated feedback.

17. The computer-implemented method of claim 14, wherein the reporting comprises variably highlighting text within the particular electronic book as a function of the correlated and aggregated feedback.

18. The computer-implemented method of claim 14, wherein the reporting comprises variably highlighting text within the particular electronic book with varying colors as a function of the correlated and aggregated feedback.

19. The computer-implemented method of claim 14, wherein the evaluative feedback comprises grammatical or typographical corrections.

20. The computer-implemented method of claim 14, wherein the evaluative feedback comprises ratings.

21. The device of claim 14, wherein the transmitting comprises transmitting each piece of the evaluative feedback in association with a particular location in the electronic book at which the human reader provided the respective piece of evaluative feedback.

* * * * *